July 26, 1960        J. J. CANTOR        2,946,555
VALVE
Filed Sept. 16, 1957        2 Sheets-Sheet 1
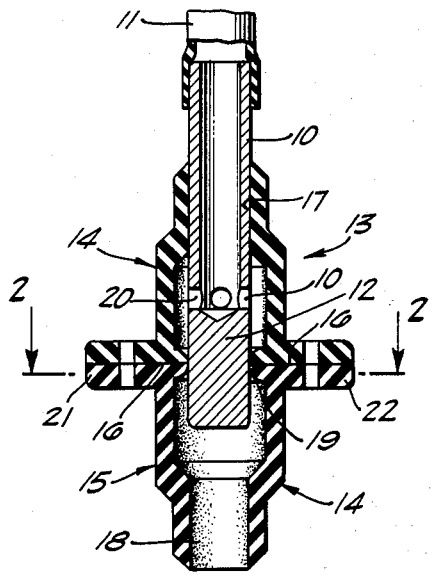
FIG. 1.
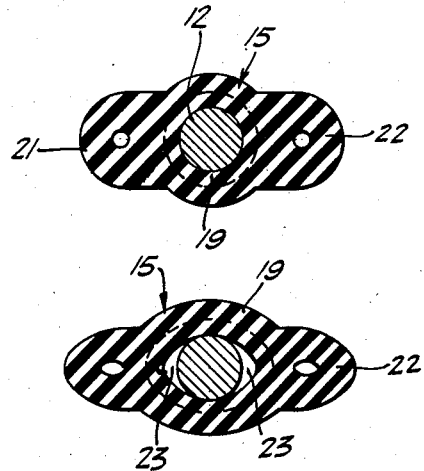
FIG. 2.
FIG. 3.
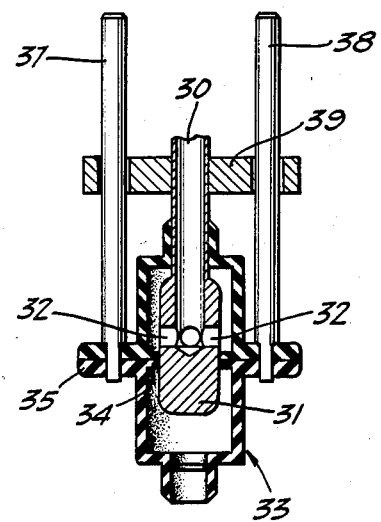
FIG. 4.
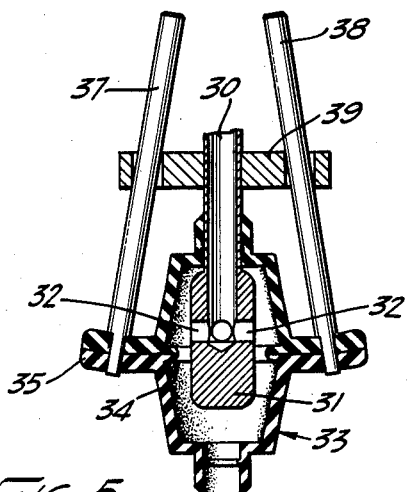
FIG. 5.
JACOB J. CANTOR
INVENTOR.
BY *Hazard & Miller*
ATTORNEYS July 26, 1960  J. J. CANTOR  2,946,555
VALVE
Filed Sept. 16, 1957  2 Sheets-Sheet 2
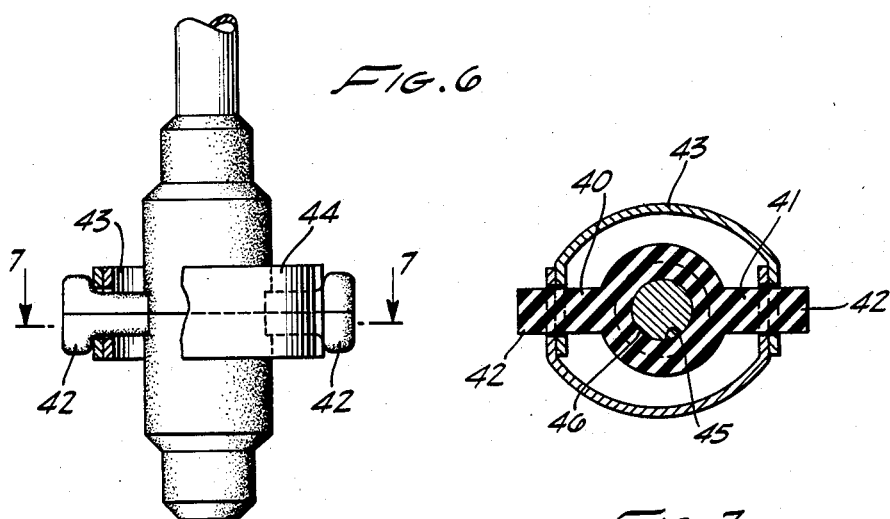
FIG. 6
FIG. 7.
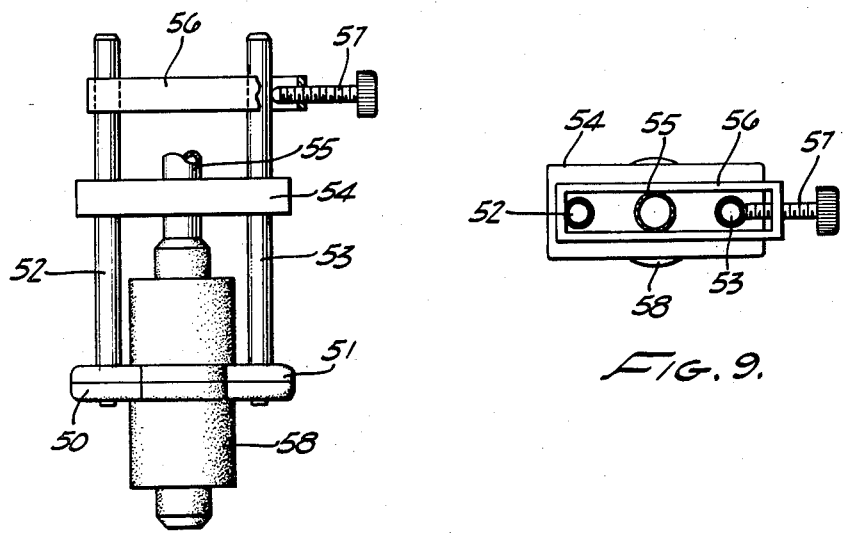
FIG. 8.
FIG. 9.
JACOB J. CANTOR
INVENTOR.
BY Hazard & Miller
ATTORNEYS

United States Patent Office 2,946,555
Patented July 26, 1960

2,946,555

VALVE

Jacob J. Cantor, 1905 Beverly Blvd., Los Angeles, Calif.

Filed Sept. 16, 1957, Ser. No. 684,259

2 Claims. (Cl. 251—342)

This invention relates to improvements in valves and may be considered as an improvement over the construction disclosed in my prior United States Letters Patent No. 2,706,101, issued April 12, 1955.

In the above-mentioned patent a valve construction is disclosed consisting essentially of a tubular body formed of resilient material into which a conduit extends. Within the body there is an internal annular ridge or dam which normally is in annular contact with the conduit. One or more discharge ports are formed in the conduit which discharge into the tubular body upstream with relation to the ridge. As long as the ridge or dam remains in complete annular contact with the conduit flow cannot take place from the discharge ports in the conduit to the outlet from the tubular body. However, if one or more portions of the ridge or dam are distorted so as to disengage the conduit such flow is permissible.

In the above-mentioned patent distortion was accomplished by squeezing the resilient body across one diameter which caused the ridge to be expanded or distended across a diameter at right angles thereto and in this manner flow was permitted to take place. On release of the body the dam or ridge returned into complete annular contact with the conduit due to the inherent resiliency of the body and flow was automatically discontinued. The above-described construction is quite satisfactory where the volume of flow when the valve was open was nevertheless to be quite small, such as for example, in permitting small quantities of chemicals to flow as in the case of chemical titrations. The objection to the valve is that when the valve is in fully open position the volume of permissible flow is still somewhat limited.

A primary object of the present invention is to provide an improved valve of this character wherein one or more portions of the internal annular ridge are moved out of annular contact with the conduit by being pulled outwardly therefrom. This enables a greater spacing of the distorted portions of the ridge from the sides of the conduit and consequently, permits of a greater volumetric flow through the valve. At the same time the valve is of equally simple construction and lends itself to the use of various devices that can be employed to distort the body in opening the valve. A release of any of such devices permits the valve to automatically close itself.

With the foregoing and other objects in view which will be made manifest in the following detailed description, reference is had to the accompanying drawings for an illustrative embodiment of the invention wherein, Fig. 1 is a sectional view through one form of improved valve embodying the present invention.

Fig. 2 is a horizontal section taken substantially upon the line 2—2 upon Fig. 1 in the direction indicated, the valve being shown in closed position.

Fig. 3 is a view similar to Fig. 2 but illustrating the valve in open position.

Fig. 4 is a sectional view through an alternative form of construction embodying the present invention, the valve being shown in closed position.

Fig. 5 illustrates the valve shown in Fig. 4 in open position.

Fig. 6 is a view in side elevation parts being broken away and shown in vertical section illustrating still another form of valve embodying the present invention.

Fig. 7 is a horizontal section taken substantially upon the line 7—7 upon Fig. 6 in the direction indicated.

Fig. 8 is a view in side elevation of still another form of valve embodying the present invention.

Fig. 9 is a top plan view of the valve shown in Fig. 8.

Referring to the accompanying drawings wherein similar reference characters designate similar parts throughout, 10 indicates a conduit preferably formed of stiff or rigid material and which may have a flexible hose 11 connected to the upper end thereof which serves to supply fluid that is to be valved to the conduit. The lower end of the conduit is closed as indicated at 12. Around the conduit there is a tubular body generally indicated at 13. This body is preferably formed of two opposed molded rubber or synthetic rubber parts indicated at 14 and 15 which are cemented or otherwise secured together at their abutting faces 16. The conduit 10 extends into the upper end of this body through an inlet opening 17, and an outlet opening 18 corresponding thereto is arranged at the bottom of the body. A conduit not shown may be thrust into the outlet opening 18 but this is unnecessary. Within the body there is formed an internal annular ridge or dam 19 which is integral with the body 13 and which is in normal complete annular contact with the lower end of the conduit 10. One or more discharge ports 20 are formed in the conduit 10 in upstream relationship to the annular contact between the ridge 19 and the conduit.

On the exterior of the body opposite the ridge 19 ears 21 and 22 are formed integral with the body. These ears may be used to stretch the body or distend the body from the position shown in Fig. 2 to the position shown in Fig. 3. When the body is released the ridge 19 is in complete annular contact with the conduit 10 as shown in Fig. 2, and in this position, flow cannot take place from the discharge ports 20 to the outlet 18. However, when the body is distorted or distended by the application of tensile forces to the ears 21 and 22, portions of the ridge are moved out of annular contact with the conduit leaving spaces 23 through which fluid may flow from the discharge ports to the outlet. These spaces 23 are usually considerably larger than the corresponding spaces in the construction shown in my prior patent and consequently the volume of flow from the conduit 10 to the outlet 18 may be considerably greater. On release of the ears 21 and 22 the body instantly returns to its normal position due to its inherent resiliency and when complete annular contact between the ridge and the conduit is re-established, the valve is automatically closed.

The above described construction lends itself to the use of a variety of mechanical devices for pulling either or both of the ears 21 and 22 outwardly. Thus, as illustrated in Figs. 4 and 5, the conduit 30 may have an enlargement 31 formed on its lower end in the upper portion of which the outlet ports 32 are arranged. The resilient tubular body 33 is similar in construction to the tubular body previously described and has an internal annular ridge 34 in normal complete annular contact with the enlargement. In this form of construction, the diametrically opposed ears 35 and 36 are equipped with upstanding levers 37 and 38 which loosely extend through a fulcrum 39 mounted on the conduit 30. By squeezing the upper ends of the levers 37 and 38 toward each other as shown in Fig. 5, the lower ends of the levers will cause the ears 35 and 36 to be pulled apart or outwardly to disengage opposed portions of the ridge 34 from the enlargement 31, thus opening the valve. On release of the levers the inherent resiliency of the rubber body causes it to automatically return to closed position. In Figs. 6 and 7 an alternative form of construction is disclosed wherein the ears 40 and 41 are equipped with heads 42 which extend through openings in the ends of two opposed bowed springs 43 and 44. If the bowed springs 43 and 44 are pressed toward each other in such a manner as to tend to flatten these springs, the effect will be to pull the ears 40 and 41 outwardly to disengage opposed portions of the ridge 45 from the sides of the conduit 46, thus permitting flow. On release of these bowed springs the resiliency of the body causes it to automatically return to closed position.

In Figs. 8 and 9, a construction is disclosed wherein the valve can be held in open position. In this form of construction the ears 50 and 51 have levers 52 and 53 loosely extending through a fulcrum 54 on the conduit 55. The upper ends of these levers are surrounded by a yoke 56 in one end of which there is an adjustable screw 57. If this screw is tightened toward the lever 53 the screw and yoke cooperate to move either or both of the levers toward each other above the fulcrum 54, causing the ears 50 and 51 to be pulled apart, thus opening the valve. The valve will remain open until such time as the screw 57 is readjusted to allow the body 58 to return to its normal position.

Various changes may be made in the details of construction without departing from the spirit or scope of the invention as defined by the claims.

I claim:

1. A valve comprising a tubular resilient body having an inlet and an outlet, a conduit extending into the inlet, a portion of the body having normal annular contact with the conduit, there being one or more outlets from the conduit into the body upstream of said annular contact, one or more ears on the exterior of the body in the vicinity of said annular contact by which a portion of the body may be pulled laterally so as to break at least a portion of said annular contact and allow flow from the outlets in the conduit to the outlet from the body, fulcrum means on the conduit and lever means secured to the ears engaging with the fulcrum means by which the ears may be pulled laterally to break portions of the annular contact with the conduit and allow flow from the outlets in the conduit to the outlet from the body.

2. A valve comprising a tubular resilient body having an inlet and an outlet, a conduit extending into the inlet, a portion of the body having normal annular contact with the conduit, there being one or more outlets from the conduit into the body upstream of said annular contact, one or more ears on the exterior of the body in the vicinity of said annular contact by which a portion of the body may be pulled laterally so as to break at least a portion of said annular contact and allow flow from the outlets in the conduit to the outlet from the body, fulcrum means on the conduit and lever means secured to the ears engaging with the fulcrum means by which the ears may be pulled laterally to break portions of the annular contact with the conduit and allow flow from the outlets in the conduit to the outlet from the body, and an adjustable means for holding the levers in positions pulling the ears outwardly.

References Cited in the file of this patent

UNITED STATES PATENTS

| | | |
|---|---|---|
| 2,572,658 | Perkins | Oct. 23, 1951 |
| 2,706,101 | Cantor | Apr. 12, 1955 |

FOREIGN PATENTS

| | | |
|---|---|---|
| 1,027,768 | France | of 1953 |
| 1,040,441 | France | of 1953 |